United States Patent [19]

Hofstein

[11] 3,925,702
[45] Dec. 9, 1975

[54] METHOD AND APPARATUS FOR IMPROVING THE READOUT CHARACTERISTICS OF ELECTRONIC STORAGE TUBES

[75] Inventor: Steven R. Hofstein, North Brunswick, N.J.

[73] Assignee: Princeton Electronic Products, Inc., North Brunswick, N.J.

[22] Filed: Mar. 8, 1974

[21] Appl. No.: 449,397

[52] U.S. Cl. .................. 315/12; 315/11; 315/13 ST
[51] Int. Cl.² .......................................... H01J 29/41
[58] Field of Search ..................... 315/11, 12, 13 ST

[56] References Cited
UNITED STATES PATENTS

| | | |
|---|---|---|
| 2,716,188 | 8/1955 | Pensak .................................. 315/12 |
| 2,839,679 | 6/1958 | Harris ................................... 315/12 |
| 3,094,644 | 6/1963 | Buckbee et al. ....................... 315/12 |
| 3,158,778 | 11/1964 | Johns .................................... 315/11 |
| 3,427,493 | 2/1969 | Adam .................................... 315/12 |
| 3,470,414 | 9/1969 | Helt et al. ............................. 315/12 |

Primary Examiner—Richard A. Farley
Assistant Examiner—G. E. Montone
Attorney, Agent, or Firm—Samuelson & Jacob

[57] ABSTRACT

A method and apparatus for improving the readout characteristics of electronic storage tubes utilizing a stored potential pattern wherein a periodic varying voltage is applied to either the cathode or the target of the tube during readout to effectively spread the energy distribution of the electrons in the reading electron beam to thereby increase the useable voltage range of the stored potential pattern.

64 Claims, 15 Drawing Figures

METHOD AND APPARATUS FOR IMPROVING THE READOUT CHARACTERISTICS OF ELECTRONIC STORAGE TUBES

The invention relates to a method and apparatus for improving the readout characteristics of electronic storage tube systems. In particular, the invention improves the gray scale, the dynamic range, the image retentivity and the image uniformity of electronic storage tubes.

While the following discussion is directed toward applying the teachings of the invention to electronic storage tubes utilizing beam current control reading, they also apply to other types of electronic storage tubes.

The invention can be readily distinguished from prior art systems in the following regard. Those prior art systems using an electron beam to read the stored signal by scanning the charge storage area (target) with a fixed potential electron beam utilize only a small fraction of the total voltage range that can be, and generally is, stored on the insulating or charge storage areas of the target. As a result, such factors as the tube's gray scale, dynamic range, image retentivity and image uniformity are limited. The invention increases the useful voltage range of the stored signal by utilizing an electron reading beam of varying potential and attains improvement of the above characteristics as will become apparent as this description proceeds. The reading electron beam of varying potential is obtained by applying a periodic varying voltage to either the cathode or the target of the tube during readout to spread the effective energy distribution of the electrons in the reading electron beam.

In some prior art electronic storage tube systems, a sinusoidal r-f voltage has been applied to the grid or cathode of the read electron gun, but for objectives other than those accomplished by the invention. Thus, in such prior art systems, the electron beam is intensity modulated. These particular techniques were used in double ended tubes in which the writing and reading are done simultaneously in order to prevent the video writing signal from feeding through to the output signal reading means. In those devices, the electron reading beam is intensity or amplitude modulated with an r-f signal to create an r-f "carrier". The carrier is now, in turn, amplitude modulated by the lower frequency, stored charge signal. Thus, the output from the storage tube, which corresponds to the stored charge pattern, is an amplitude modulated, r-f carrier. Reading is then accomplished by using circuits very similar to those used for the detection of amplitude modulated radio signals. The writing video signal, being of significantly lower frequency is ignored by the higher frequency r-f detection circuits and thus the desired isolation between reading and writing is achieved.

Examples of some of the prior art devices referred to immediately above are shown and described in the following U.S. patents:

In Kettler et al (U.S. Pat. No. 3,408,627) the r-f signal is applied to the grid or cathode of the read electron gun to amplitude or intensity modulate the read electron beam for the purpose of isolating the read and write signals. No significant change in the energy level distribution of the electron beam is utilized.

In Pensak (U.S. Pat. No. 2,716,188) and r-f signal is coupled to the grid of a barrier-grid type storage tube in order to intensity modulate the electron reading beam and thereby produce an r-f carrier beam for purposes of separating the writing signal from the read signal output.

In Buckbee et al (U.S. Pat. No. 3,094,644) the read beam is intensity modulated in order to separate the input writing video from the stored charge signal in a double-ended storage tube.

Harris (U.S. Pat. No. 2,839,679) also intensity modulates the electron reading beam to produce an r-f carrier beam to isolate the read and write signals.

In Jensen (U.S. Pat. No. 2,942,107) an applied sine wave signal is utilized in several circuit configurations for the purpose of operating synchronizing and timing signals. These signals are then used in conjunction with gated read amplifiers to synchronize them so as to suppress undesired transients usually appearing in the output read signal.

In the following U.S. patents, the r-f signal is applied only to the writing electron beam:

Goodwin et al (U.S. Pat. No. 2,837,643) uses r-f pulsing of the writing beam by applying the r-f signal to the grid of the storage tube. Thus, an amplitude modulated beam is utilized to isolate the video input from the stored charge modulation of the reading beam.

Plaistowe (U.S. Pat. No. 3,360,680) utilizes r-f chopping of the writing beam of a double-ended storage tube in order to intensity modulate the beam.

It can readily be seen that these prior art systems use an r-f signal to create an intensity or amplitude modulated r-f carrier electron beam, generally for reading. The r-f signal is not used to change the energy level distribution of the reading electron beam with respect to the potential on the charge storage area while maintaining the amplitude or signal current level of the beam constant. In the prior art devices, the reading electron beam, which is generally emitted from a cathode having a fixed potential, is amplitude modulated at an r-f rate. The instant invention utilizes a periodic varying voltage to vary the energy level or potential level distribution of the electrons in the reading beam while keeping the amplitude of the beam relatively constant.

Broadly, the invention relates to a method and apparatus for improving the read characteristics of electronic storage tubes by varying the energy level or potential level distribution of the electron beam with respect to the charge potential on the charge storage area.

It is an important object of the invention to provide a method and apparatus for improving the readout characteristics of electronic storage tube systems by greatly increasing the useful voltage range of the stored signal on the insulating storage area.

It is a further object of the invention to improve the gray scale, the dynamic range, the image retentivity and the image uniformity of such systems.

It is another object of the invention to accomplish the foregoing by applying a periodic varying voltage between the charge storage area (target) and the source of the electron beam (cathode).

It is yet another object of the invention to apply the periodic varying voltage between equipment ground and the tube cathode.

It is a still further object of the invention to apply the periodic varying voltage between equipment ground and the target.

It is still another object of the invention to utilize the periodic varying voltage whose frequency is higher than the highest frequency of the signal to be read by the output signal reading means (read amplifier).

These and other objects, advantages, features and uses will be apparent during the course of the following description when taken in conjunction with the accompanying drawing, wherein.

Figure 13:
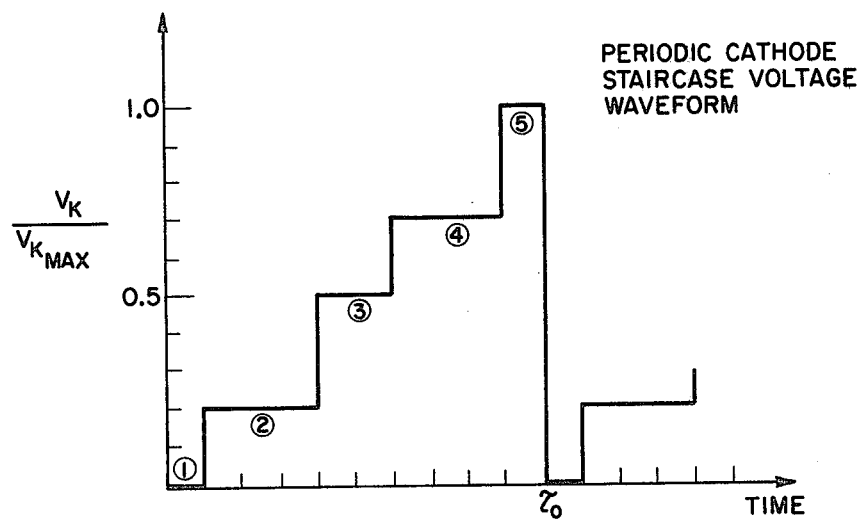
FIG. 13 is a time plot of a staircase periodic varying voltage.
Figure 14:
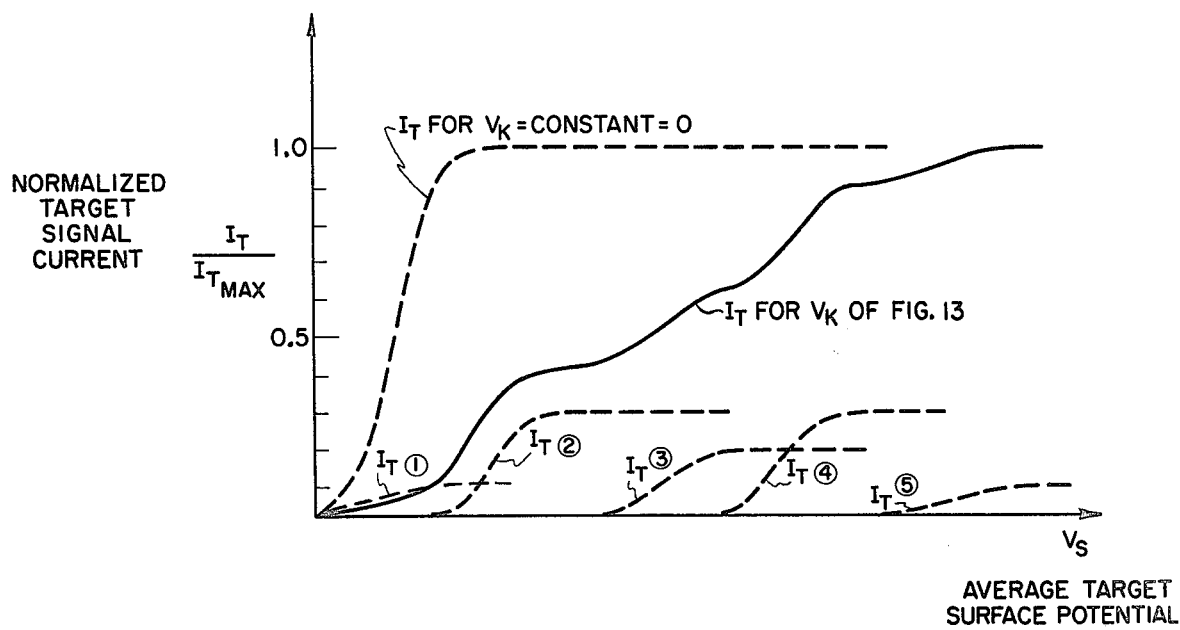
Figure 15:
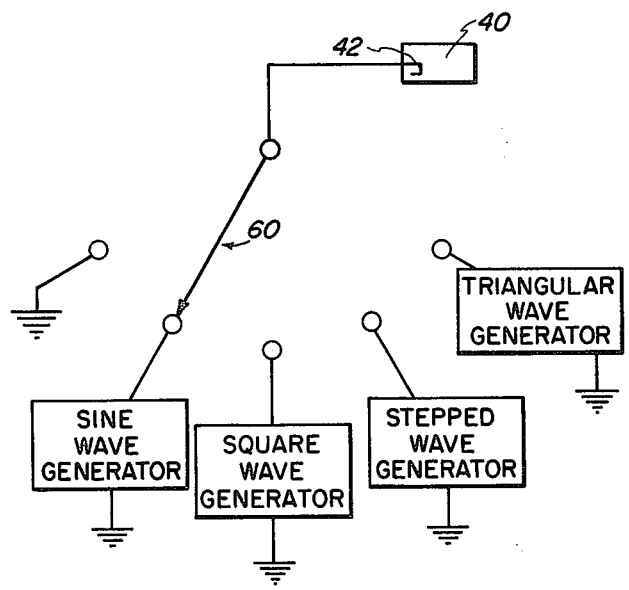

FIG. 14 is a plot of the normalized target signal current against average target surface potential when the periodic varying voltage of FIG. 13 is applied between the cathode of a storage tube and equipment ground; and FIG. 15 is a block diagram of a system for selecting the waveform of the periodic varying voltage to be applied between, for example, the cathode of the storage tube and equipment ground.

Electronic output storage tubes generally utilize a charge storage member which retains a pattern of charge representing information which is to be stored. Electronic output storage tubes utilizing the beam current control reading technique, and in particular the so-called coplanar barrier grid or "coplanar grid" tube where the barrier grid is integral with the insulating charge storage surface of the target, have continued to find growing areas of application. The coplanar grid target utilizes a charge storage member in the form of a pattern of insulating charge storage areas on a conducting layer such that negative stored charge on the insulator surfaces acts to control beam current flow to the positive potential conducting layer. Since the potential on the insulator surfaces is everywhere negative with respect to the beam source (cathode) during reading, the beam does not land on the insulator and non-destructive readout is achieved.

In what is commonly referred to as the ERASE mode of operation, the target potential is raised to a moderately positive potential (e.g., +20 volts) such that the insulator surface potential is raised above the cathode potential, but is kept below the potential above which secondary emission causes more electrons to be knocked off the insulator surface than land on it. The electron beam then scans the target, charging the surface potential negatively towards equilibrium. This mode is commonly called the ERASE mode since it is often used to restore the insulator surface potential to a single uniform value, thus erasing any stored image. In some applications, however, this equilibrium charging mode may be coupled with selected x-y scanning of the beam (rather than a uniform raster scan) and/or a several volt modulation of the target-to-cathode potential as the beam scans and charges the insulator surface. In this case, equilibrium charging may be used to create a desired varying charge pattern, or WRITE an image.

Detailed discussion of equilibrium and secondary emission writing may be found in the literature [see Kazan and Knoll, "Electronic Image Storage," Academic Press, N.Y. (1968)].

For purposes of convenience in the following discussion, "ERASE" therefore will be considered to mean charging of the insulator surface to a uniform potential value. Similarly, "WRITING" will be considered to be the process of creating a desired stored charge pattern whether by secondary emission, by equilibrium charging or by other combinations of similar means.

A coplanar grid target storage tube and its method of operation are described further in my U.S. Pat. No. 3,631,294 which issued on Dec. 28, 1971. Most of the following discussion is directed toward using the teachings of the present invention on such tubes whose targets are preferably of the coplanar grid type, one embodiment of which is formed of silicon/silicon dioxide. However, it is within the contemplation of the invention to utilize its teachings on other electronic storage tubes.

In the drawing, wherein, for the purpose of illustration, there are shown preferred embodiments of the apparatus of the invention, the numeral 10 designates a coplanar-grid, silicon/silicon dioxide target, electronic storage tube. Storage tube 10 is seen to comprise (FIG. 1) envelope 12, control grid 14, cathode 16, accelerating anode 18, wall anode 20, target 22 which comprises substrate 24 and mosaic layer 26, focusing coil 28, deflecting coil 30, output terminal 32, grid mesh 34 and source of periodic varying voltage 36 applied, for example, between equipment ground and cathode 16.

The WRITE signal can be applied to the target in many ways, including either by x-y deflection of the electron beam emitted by the cathode 16 or by amplitude modulation of a raster scan beam. During the READ mode, a periodic varying voltage signal is applied to the cathode which causes a periodic variation in the energy level of the raster scan electron beam which is applied to the target. During this READ mode, output current proportional to the charge pattern on the target (the distribution of charge on the insulating areas of the target) is obtained at output terminal 32 when the raster scan electron beam sweeps the target 22.

Means are provided for removing this periodic varying voltage signal from the cathode during the WRITE and ERASE modes for reasons which will become evident as this description proceeds.

Figure 2:
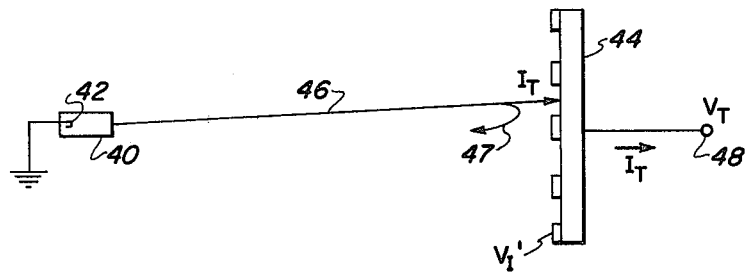
FIG. 2 is a simplified schematic diagram showing the action of an electron beam emitted from a grounded cathode source at the target of a coplanar barrier grid or "coplanar grid" storage tube.

Refer now to FIG. 2 which is a simplified schematic diagram of a storage tube having an electron gun 40 with a grounded cathode 42, a coplanar grid target 44 of silicon/silicon dioxide and an output terminal 48. The beam 46 scans the target 44 and some of the beam is reflected as shown at 47. Let $V_i =$ insulator surface potential; $V_T =$ potential of the conducting collector plate and $I_T =$ output signal current.

Figure 3:
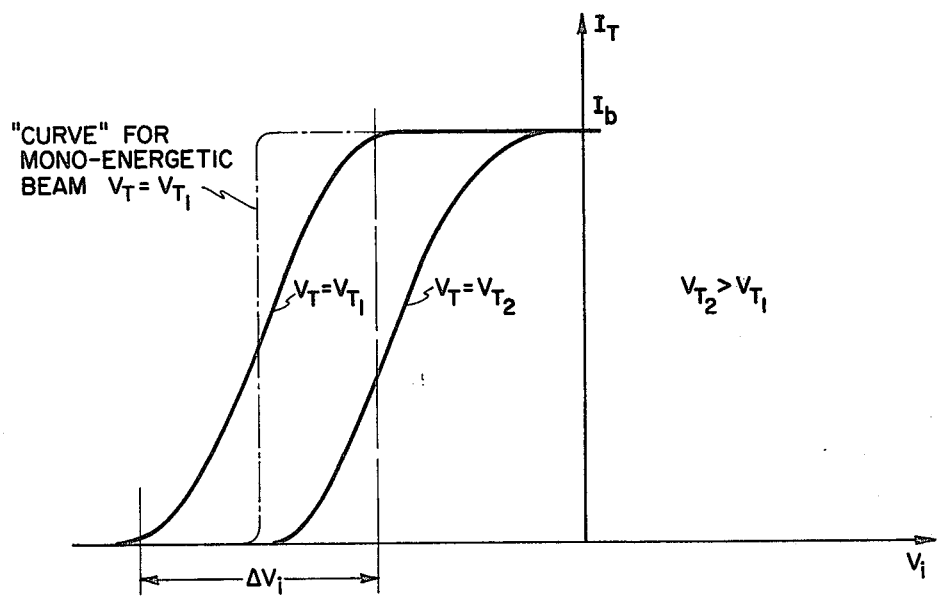
FIG. 3 is a plot of output current as a function of insulator surface potential for two different target potentials.

FIG. 3 illustrates the variation of $I_T$ as a function of $V_i$ for two different target potentials. It can be seen that over a limited voltage range $\Delta V_i$, the output current rises from zero to maximum. It is over this range of $\Delta V_i$ that the gray scale is obtained. This gray scale range exists because the electrons in the beam are not mono-energetic, namely, they have a distribution of energies due to the angular spread of the beam as well as the high temperature of the cathode.

If, in fact, the electrons were mono-energetic, then for values for $V_i$ for which the average surface potential as given by $V_S = V_i A'_i + V_T (1-A'_i)$ (where $A'_i =$ normalized surface area of the target covered by insulator) was equal to or negative with respect to the cathode potential, no electrons at all would land. For less negative values of $V_i$ the average surface potential would be positive and all the electrons would land.

Interestingly, in image tubes such as the Vidicon, where the readout is destructive of the stored image and the reading signal is generated by capacitive discharge of the target rather than by beam current landing control, there is no dependence on the energy spread described above. Ideally, a capacitive discharge image tube's best performance, including good gray scale, would be obtained with a mono-energetic beam. Thus, it can be seen that the beam energy distribution which is desirable in electronic storage tubes utilizing beam current landing control for non-destructive reading is undesirable in image tubes due to problems such as image lag and unenhanced gray scale characteristics.

Although the energy distribution of electrons in the beam is responsible for the gray scale characteristics of the coplanar grid target storage tube, it has other undesirable effects, such as extending the time required to erase a stored image.

There are several key parameters of the storage tube which are directly affected by the value of $\Delta V_i$:

A. Image Non-Uniformity of Shading — Image shading can be caused by several factors, two of the most significant are gun or electron beam-landing shading and target non-uniformity.

Both of these factors may be expressed as equivalent variations in $V_i$ over the target area. Typically, variation values are one of 3 volts. Since the typical values of $\Delta V_i$ over which full dynamic output signal range is obtained range from four to 6 volts, a shading variation of $V_i$ of 2 to 3 volts equivalent can result in image shading as high as forty or fifty percent in extreme cases. A large value of $\Delta V_i$ would tend, therefore, to minimize the relative shaping and improve image uniformity.

B. Retention Time — In the operation mode most commonly employed for the coplanar grid storage tube, the potential difference between the insulator surface and the conducting backplate is made larger than the control range $\Delta V_i$. Hence, $$\frac{dV_i}{dt},$$

the shift in insulator surface potential with time due to leakage and gas ion discharge, is normally constant over the effective range of $\Delta V_i$ and can be expressed in volts per minute. In this case, the retention time is given by the relation $\tau_R = \Delta V_i/dV_i/dt$ and hence the larger the value $\Delta V_i$, the slower the image fades. In effect, the retention time increases linearly with increases in $\Delta V_i$.

C. Equilibrium Charging Time — To erase an image, the target potential is raised and the insulator surface is charged negatively to a uniform potential by scanning with the electron beam (see Kazan and Knoll, page 103). The well known effect of a finite beam energy distribution or "tail" in the case of equilibrium charging (whether for ERASE or equilibrium WRITE) is to cause the erasure or writing of the image to become extremely inefficient. This phenomenon is related to the well known "capacitive lag" effect in imaging tubes. For purposes of erasure, it is therefore desirable to have a mono-energetic beam of electrons, or a beam for which the energy distribution is very small. As discussed previously, $\Delta V_i$ is normally a direct function of the beam energy distribution.

The present invention provides a method and apparatus for electronically expanding the effective energy distribution of the beam electrons, and hence $\Delta V_i$, during the READ mode of operation (when it is desirable) and minimizing it in the ERASE and WRITE modes.

The basic technique involves applying a periodic varying voltage signal between the cathode and the target of the storage tube during the READ mode of operation. The frequency of this signal is chosen to be above the normal bandwidth of the output signal READ amplifier. The effect of this periodic varying voltage signal is to spread the effective energy distribution of the electrons in the beam as seen by the target.

Figure 4:
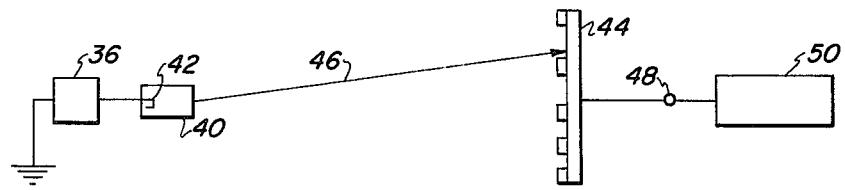
FIG. 4 is a view similar to that of FIG. 2 showing the insertion of a periodic varying voltage between the tube cathode and equipment ground during readout.
Figure 5:
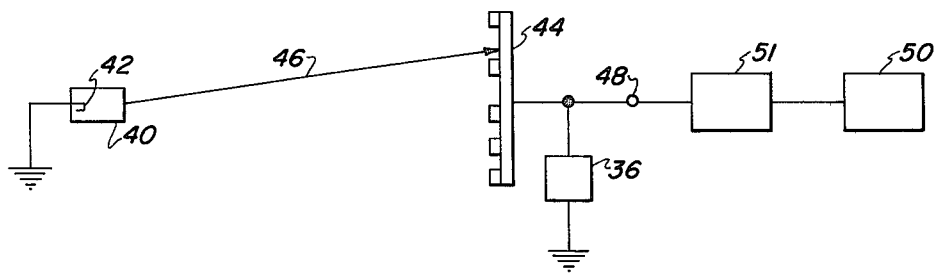
FIG. 5 is a view similar to that of FIG. 2 showing the insertion of a periodic varying voltage between the tube target and equipment ground during readout.

FIG. 4 illustrates the introduction of a periodic varying voltage signal between cathode 42 and equipment ground. FIG. 5 illustrates the introduction of the periodic varying voltage signal between target 44 and equipment ground. In the configuration of FIG. 5, it is desirable to use a high frequency filter 51 between the target 44 and the read amplifier 50 to prevent saturation of the first stage of the preamplifier of amplifier 50. When the periodic varying voltage signal is applied to the cathode, the effective amplitude of the periodic varying voltage signal appearing at the target is of the same order of magnitude as the signal current. In this case, the filtering effect of the read amplifier's limited bandwidth is usually sufficient to remove the periodic varying voltage signal from amplifier. It is usually not necessary to use a filter when the periodic varying voltage signal is applied between the cathode and equipment ground and hence, in practice, it is usually desirable to apply the periodic varying voltage signal at that point. However, the essential point is that the periodic varying voltage signal must be applied between the cathode and the target so that the potential difference between that of the electron beam and the average target potential is varied.

For the purpose of clarity, the following discussion will refer to the embodiment in which the periodic varying voltage signal is applied between the cathode and equipment ground (to the cathode).

Figure 1:
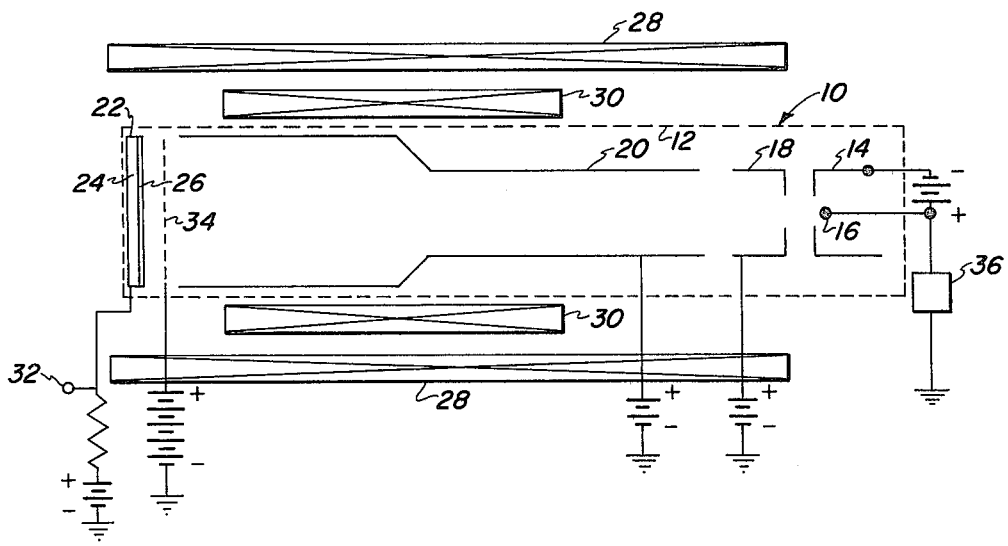
FIG. 1 is a diagrammatic elevational view of an electron storage tube utilizing the teachings of the invention.

In FIG. 1, the control grid 14 is shown returned to the cathode 16 by a d-c voltage source. With this configuration, intensity modulation of the electron beam by the periodic varying voltage signal, which modulation, for purposes of this invention is a spurious and irrelevant effect, is minimized. In practice the control grid 14 is most often returned via a d-c voltage to ground. In that case, the cathode to control grid period varying voltage signal whose amplitude is typically less than 5 volts, peak to peak, can cause a slight intensity modulation, usually less than 10% of the electron beam. Although this intensity modulation is not utilized in the present invention, it is not significantly deleterious and hence may be ignored.

Figure 9:
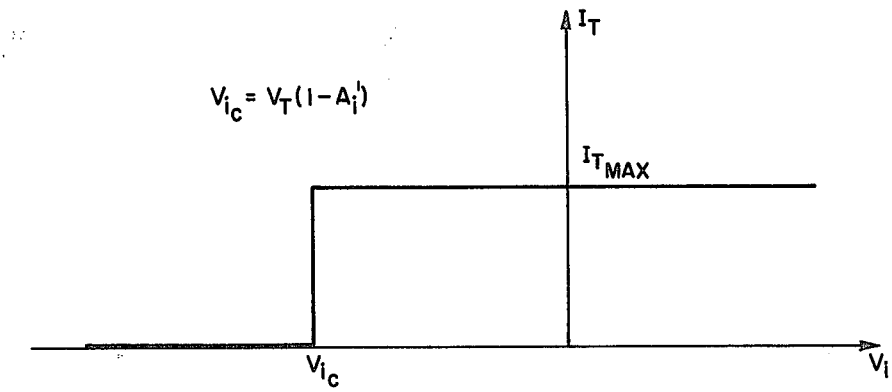
FIG. 9 is a plot of step function signal current against insulator surface potential.
Figure 10:
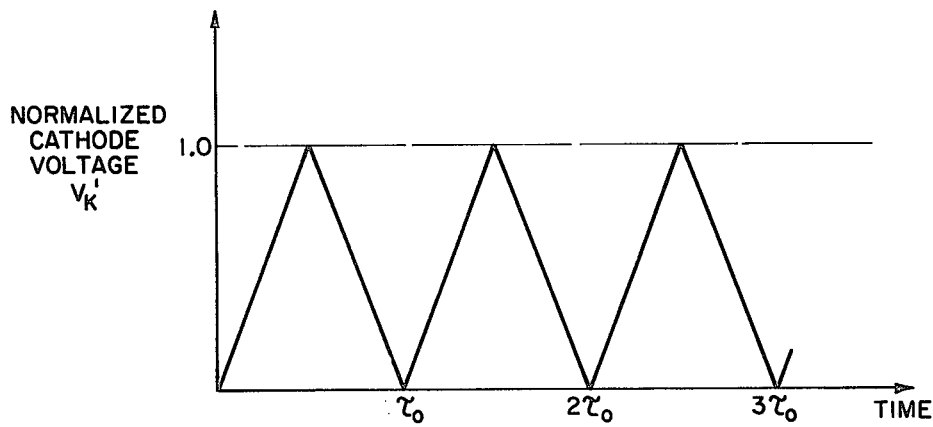
FIG. 10 is a plot of periodic voltage signal of triangular waveform and normalized amplitude of 1.0.
Figure 11:
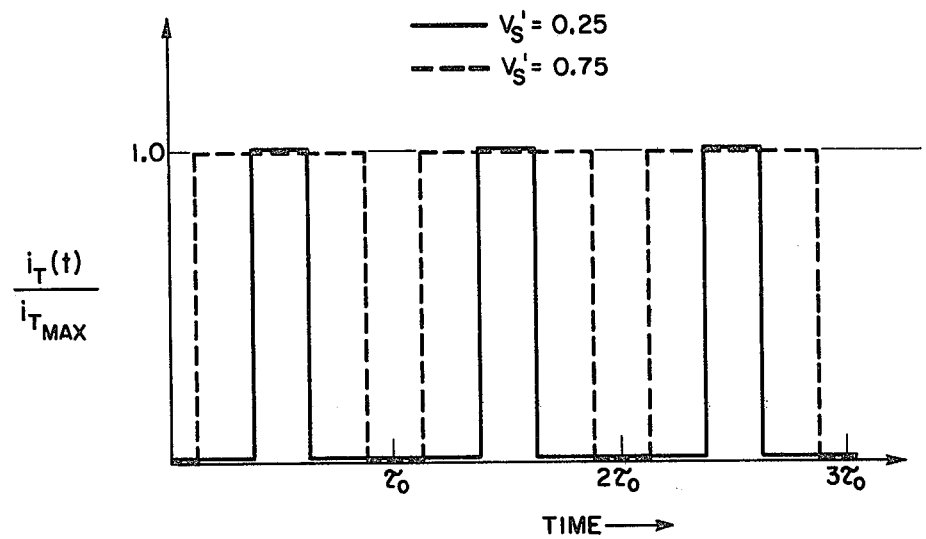
FIG. 11 is a plot of the time waveform of the signal current for two different normalized, average target surface potentials.
Figure 12:
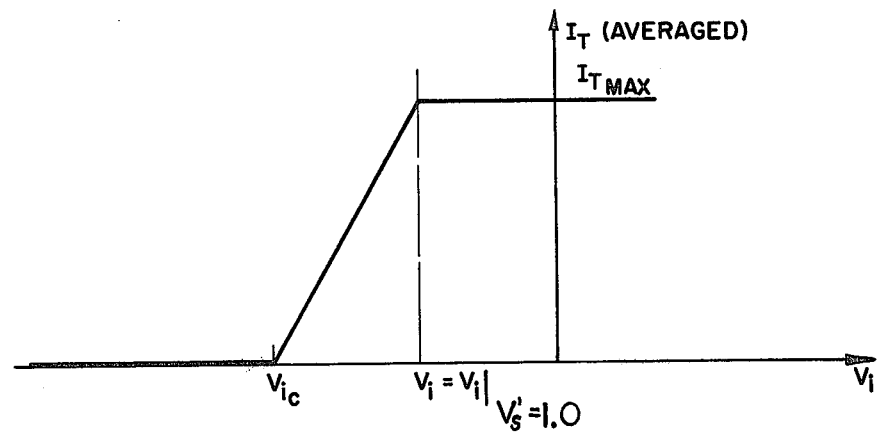
FIG. 12 is a plot of the average output signal of FIG. 11 against the target insulator surface potential.

In order to better understand the "energy spreading" technique of the present invention we may consider the simplified illustrative case of a mono-energetic electron beam. In FIG. 9 there is shown a plot of the simple step function signal current against the insulator surface potential $V_i$ landing characteristics of such a beam. For negative values of $V_i$ such that the average surface potential $V_s$ is negative [i.e. $V_i \leq - V_T (1-A'_i)$ referenced to the emitting cathode], no electrons land. For values of $V_i$ such that the average surface potential is positive all the electrons land. Assume now that a periodic varying signal of triangular waveform and normalized amplitude of 1.0, as shown in FIG. 10, is applied to the cathode. FIG. 11 shows the time waveform of the signal current $i_T(t)$ to the target for two normalized average target surface potentials $V_s' = V_T' (1-A_c') + V_i' (A_c')$. For negative $V_s'$ no beam current lands. For a target potential $V_s'$ between 0 and 1.0, the electron beam lands on the target only for that interval of time for which the cathode potential is below, or more negative than $V_s'$. Thus, during each cycle of the cathode voltage waveform, a pulse of current, whose time duration is determined by the potential $V_s'$, lands on the target. For the illustrative simplified case under consideration, the time width of this current pulse with respect to the period of the cathode periodic varying voltage signal is $T = \tau_0 V_s'$, where $0 \leq V_s' \leq 1.0$. From a spectral analysis viewpoint, the output signal current possesses an "average" current $I_T$, plus high frequency a-c components at $f_o = (1/\tau_o)$ and integral multiples of $f_o$. If the output signal means possesses an upper bandwidth limit which is below $f_o$, then only the average component of the output signal below $f_o$ is detected. In common terminology, the output signal means "averages" the output signal. FIG. 12 shows a plot of this average output signal versus target insulator surface potential $V_i$. It is important to note that the average output signal referred to here can contain frequency components from d-c to $f_o$. The maximum current is reached in this case when $V_s' \geq 1.0$. Comparing FIG. 12 with FIG. 9 it can be seen that the net effect of the periodic varying voltage signal is to produce an effective energy distribution in the previously mono-energetic electron beam.

In practice, the electron beam is not mono-energetic but rather possesses an energy distribution related to the angular distribution of the beam "bundle" as well as the thermal effects of the cathode emission. The effect of the periodic varying voltage signal in this case is fundamentally similar to the illustrative case just discussed.

Figure 6:
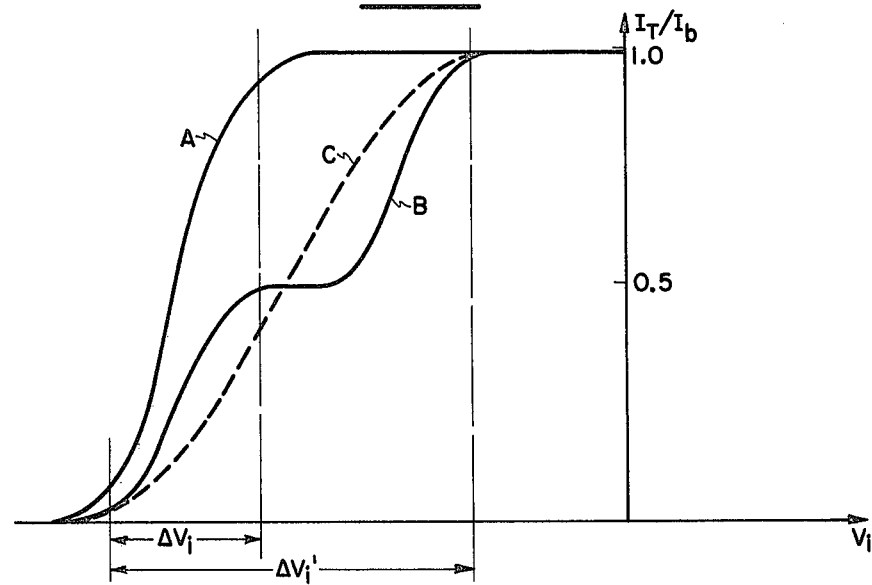
FIG. 6 is a plot of output current against insulator surface potential for three different cathode voltage conditions.

FIG. 4 illustrates the introduction of the periodic varying voltage signal between cathode 42 and ground. Referring to FIG. 4, the waveform of the periodic varying voltage signal plays a strong role in modifying the shape of the $I_T$ vs. $V_i$ curve. FIG. 6 illustrates $V_i$ vs. $I_T$ curves for three cases:

A is a plot with cathode 42 grounded;
B is a plot with a high frequency square wave applied to cathode 42; and
C is a plot with a high frequency sine wave applied to cathode 42.

Referring now to FIG. 6, the action of the square wave is to generate two super-imposed output curves, each corresponding to one level of the cathode square wave input. The sine wave produces a smoother distribution.

For the typical beam bundle angle and cathode temperature of high resolution electron guns, $\Delta V_b$, the basic energy spread of the electrons in the beam is of the order of 2 volts. The insulator voltage range $\Delta V_i$ required to control the current to the target from cutoff to maximum is, to a close approximation, given by $\Delta V_i = \Delta V_b/A_i'$ where $A_i'$ =normalized insulator surface area. For a typical target $A_i'$ is of the order of 0.25 to 0.35. Hence, as mentioned previously $\Delta V_i$ normally falls in the range of 4 to 6 volts.

To a good approximation the periodic varying voltage signal acts to increase the beam energy spread in an additive fashion. For a simple triangular or sinusoidal periodic varying voltage signal waveform the relationship between the new energy spread $\Delta V_b'$, the beam's basic spread $\Delta V_b$ and the periodic varying voltage signal, $V_{PVV}$ is $\Delta V_b' \approx \Delta V_b + V_{PVV}$. Hence, the increase in $\Delta V_i$ with the periodic varying voltage signal is approximately $$\Delta V_i' = \Delta V_i \frac{(V_{PVV} + \Delta V_b)}{\Delta V_b} \approx \Delta V_i (V_{PVV/2}+1).$$

Thus, we can electronically increase the spread $\Delta V_i$ to $\Delta V_i'$. As discussed previously, this immediately reduces the shading in this case by a factor corresponding to $(V_{PPV}/2) + 1$. Similarly, retention time is increased by the same factor. In the erase mode, $V_{PVV}$ is set to zero. Hence, the energy spread in the beam during erase is narrowed to the original distribution, which is now a factor of $1 + (V_{PVV}/2)$ smaller than the operating range of $\Delta V_i'$. This substantially improves the ability to erase residual images.

Other factors, such as target patterns and background are also substantially improved.

It is worthwhile to note that the effective range of $\Delta V_i$ may therefore be multiplied many times by values of $V_{PVV}$ that range typically from two to ten volts. For the larger values of $V_{PVV}$ (e.g., < 5 volts) the waveform of the periodic varying voltage signal begins to dominate the $I_T$ vs. $V_i$ curve compared to the effect of the basic energy spread $\Delta V_b$. Thus, tailoring of the $I_T$ vs. $V_i$ transfer curve to a desired shape may be readily accomplished.

As an example, consider the case of a "staircase" periodic waveform as shown in FIG. 13. Each step of this waveform contributes a portion to the output signal as shown in FIG. 14. For each step $n$ a miniature $I_{Tn}$ vs. $V_s$ curve exists where the amplitude of $I_{Tn}$ is: $I_{Tn} = I_T \tau_n/\tau_o$ and the functional voltage dependence is:

$$I_{Tn} (V_s) = \left[\frac{\tau n}{\tau o}\right] \left[I_T (V_s - V_n)\right].$$

In other words, for each step $n$, an $I_{Tn}$ vs. $V_s$ curve is created which is offset in voltage by the amplitude of the step, ($V_{Kn}$), and has an amplitude proportional to the duration of the step n ($1_{Tn\max}=\tau_n/\tau_0\, 1_{T\max}$).

The final $I_T$ vs. $V_i$ curve is, of course, the sum of all the $I_{Tn}$ curves. Thus, by adjusting the amplitude, duration, and number of steps in the cathode voltage waveform, a good stepwise approximation to a wide range of desired signal-current versus stored-potential $V_i$ transfer curves may be achieved.

By way of illustration but not by way of limitation of the scope of the invention, the following is an example of the results obtained utilizing the teachings of the invention. A 50 MHz sine wave with an amplitude of 5 volts, peak to peak, was applied between the cathode and ground of a coplanar grid target electronic storage tube. The bandwidth of the READ amplifier was d-c to 30 MHz. The retention time was found to have increased from ten minutes to over forty minutes, the shading over the picture area was reduced from 20 to less than 5% and the overall gray scale linearity was greatly improved.

Figure 7:
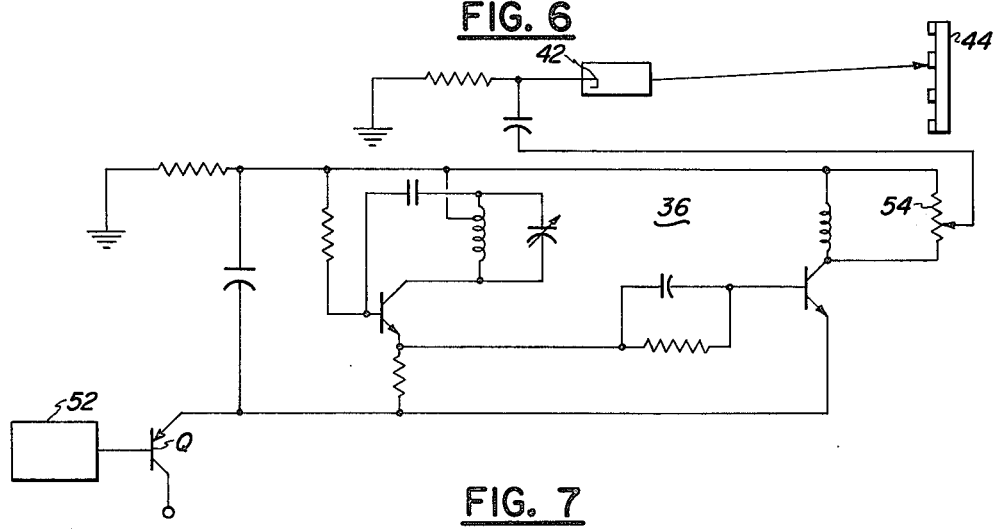
FIG. 7 is a circuit used to apply the periodic varying voltage signal to the cathode of a coplanar grid target electronic storage tube during the readout mode.

FIG. 7 is a diagram of a typical circuit which may be used to apply a periodic varying voltage signal between equipment ground and cathode 42 during the READ mode. An actuating signal is applied to the base of transistor Q, during the READ mode, and is removed during the WRITE and ERASE modes. This is accomplished by suitably programming switch 52 which may be, for example, a gate. Thus, the periodic varying voltage signal is only applied during the READ mode and is precluded from being applied during the WRITE and ERASE modes. A gain control 54 is provided to vary the amplitude of the periodic varying voltage signal being applied to the tube so that the potential distribution range of the electron beam may be optimized to that stored on the target, and hence optimize the reading range of the tube.

By making gain control 54 variable during reading, the gray scale contrast can be varied to allow detailed evaluation. It is possible to decrease the amplitude of the periodic varying voltage signal, for example, while the d-c target voltage, $V_T{}'$ is raised and lowered to allow enhanced examination of the gray scale characteristic.

Figure 8:
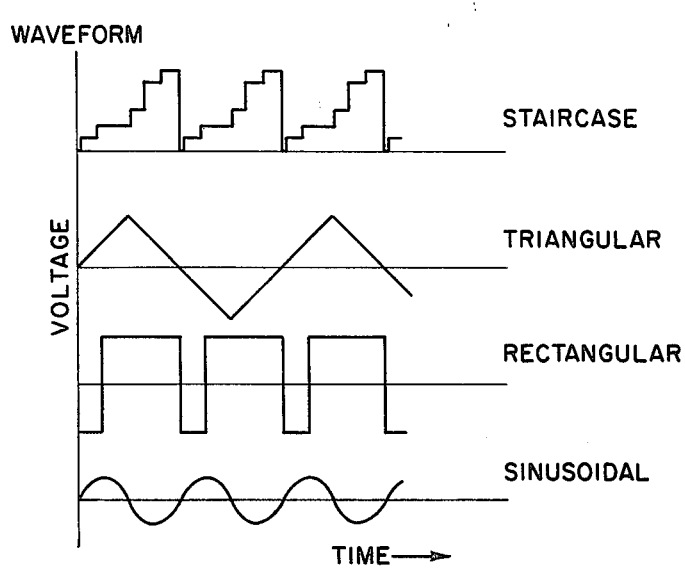
FIG. 8 is a plot of examples of various waveforms which may be used to carry out the teachings of the invention.

Although much of the previous discussion has dealt with a sinusoidal periodic varying voltage signal, the waveform of the varying voltage presents efficient means for tailoring or optimizing the transfer function characteristics or gamma of the tube. FIG. 6 shows the variation in output current ($I_T$) versus "stored input level" ($V_i$) for square wave and sinusoidal periodic varying voltage signals. Other waveforms such as staircase and triangular which are shown in FIG. 8 may be used to further tailor or optimize the $I_T$ vs. $V_i$ curve.

The $I_T$ vs. $V_i$ curve is particularly important as it plays a major role in determining the gray scale transfer function characteristics of the tube and systems using the tube. The transfer curve is basically a plot of the output signal versus input signal performance of the device or system. Although some modification of the transfer curve is possible by utilizing non-linear amplifiers and "gamma" correction circuits, the fundamental transfer curve for the tube plays the major role in determining the final transfer function for the system.

Curve A of FIG. 6 shows the typical S shaped curve common to conventional operation of a coplanar barrier grid storage tube. This curve indicates that both the black and white levels will be compressed. The effect of the periodic varying voltage signal of curve C is to tend to linearize the $I_T$ vs. $V_i$ curve and minimize black and white compression. In general, once a particular desired $I_T$ vs. $V_i$ transfer curve is chosen, a waveform for the periodic varying voltage may be designed to achieve the desired curve. As discussed previously, a staircase type waveform in which the amplitude and duration of the steps are adjustable provides very versatile means of achieving this. For a linear transfer function of $I_T$ vs. $V_i$, the preferred waveform is a triangular waveform although a sawtooth or even sinusoidal waveform may still be suitable. Curve B of FIG. 6 is a plot showing the effect of the application of high frequency square wave signal to the cathode of the storage tube. Curve C shows the effect of the application of a high frequency sine wave signal to the cathode of the storage tube.

In FIG. 15 there is illustrated a simplified block diagram of a switching system for utilizing the best possible waveform for maximizing the reading of a particular charge pattern. The system illustrated is of the type which may be operated by the user. Where a single waveform is expected to be the only one to be used in a particular installation, the signal generator required to produce that desired waveform may be installed at the factory.

After the appropriate waveform generator is selected by means of switch 60, the desired gray scale and curve slope is obtained by adjusting an amplitude control such as control 54 (FIG. 7) while viewing the image being read. Thus, the desired contrast and intensity for maximum utility of the stored image may be obtained in many, many more cases than is otherwise possible.

The amplitude control must always be capable of being adjusted by the operator while viewing the readout image but the selection of waveform may be built in at the factory or may be an operator adjustment.

While particular embodiments of the invention have been shown and described, it is apparent to those skilled in the art that modifications are possible without departing from the spirit of the invention or the scope of the subjoined claims.

The embodiments of the invention in which an exclusive property or privilege is claimed are defined as follows:

1. The method of improving the readout characteristics of an electronic storage tube system having a charge storage member, a source of a reading electron beam and output signal reading means, which method comprises:

applying a periodic varying voltage between the source of the reading electron beam and the charge storage member to thereby vary the energy level of the electrons in the reading electron beam relative to the potential pattern on the charge storage member;

the frequency of said periodic varying voltage being higher than the highest frequency of the signal to be read by the output signal reading means;

whereby the usable voltage range of the potential pattern on the charge storage member is increased.

2. The method of claim 1 wherein the periodic varying voltage is applied between equipment ground and the source of the reading electron beam.

3. The method of claim 2 wherein the periodic varying voltage is sinusoidal.

4. The method of claim 2 wherein the periodic varying voltage is a rectangular wave.

5. The method of claim 2 wherein the periodic varying voltage is a triangular wave.

6. The method of claim 2 wherein the periodic varying voltage is a staircase or stepped wave.

7. The method of claim 1 wherein the shape and amplitude of the waveform are adjusted to achieve a specific desired transfer function characteristic of the tube.

8. The method of claim 6 wherein the amplitude and duration of the steps are adjusted to achieve a desired transfer function characteristic.

9. The method of claim 1 wherein the application of the periodic varying voltage signal is prevented during the erase mode.

10. The method of claim 1 wherein the application of the periodic varying voltage signal is prevented during the write mode.

11. The method of claim 1 wherein the periodic varying voltage is applied between equipment ground and the charge storage member.

12. The method of claim 11 including the step of filtering the signal from the charge storage member to prevent application of the periodic varying voltage to the output signal reading means.

13. The method of claim 11 wherein the periodic varying voltage is sinusoidal.

14. The method of claim 11 wherein the periodic varying voltage is a rectangular wave.

15. The method of claim 11 wherein the periodic varying voltage is a triangular wave.

16. The method of claim 11 wherein the periodic varying voltage is a stepped wave.

17. The method of claim 11 wherein the shape and amplitude of the waveform are adjusted to achieve a specific desired transfer function characteristic for the tube.

18. The method of claim 16 wherein the amplitude and duration of the steps are adjusted to achieve a desired transfer function characteristic.

19. The method of claim 11 wherein the application of the periodic varying voltage signal is prevented during the erase mode.

20. The method of claim 11 wherein the application of the periodic varying voltage signal is prevented during the write mode.

21. In an electronic storage tube system having an electronic storage tube with a charge storage member and a source of a reading electron beam and output reading means, the improvement which comprises:
means for applying a periodic varying voltage connected between the source of the reading electron beam and the charge storage member to thereby vary the energy level of the electrons in the reading beam relative to the potential pattern on the charge storage member and increase the usable voltage range of the potential pattern on the charge storage member;
the frequency of said periodic varying voltage being higher than the highest frequency to be read by the output signal reading means.

22. The invention of claim 21 including means for adjusting the amplitude of the periodic varying voltage.

23. The invention of claim 22 including means for adjusting the d-c potential difference between the source of said reading beam and said charge storage member.

24. The invention of claim 22 wherein the periodic varying voltage is sinusoidal.

25. The invention of claim 22 wherein the periodic varying voltage is a rectangular wave.

26. The invention of claim 22 wherein the periodic varying voltage is a triangular wave.

27. The invention of claim 22 wherein the periodic varying voltage is a stepped wave.

28. The invention of claim 22 including means for adjusting the shape and amplitude of the waveform to achieve a specific desired transfer function characteristic for the tube.

29. The invention of claim 27 including means for adjusting the amplitude and duration of the steps to achieve a desired transfer function characteristic.

30. The invention of claim 22 including means for precluding the application of the periodic varying voltage signal during the erase mode.

31. The invention of claim 22 including means for precluding the application of the periodic varying voltage signal during the write mode.

32. The invention of claim 22 wherein the tube is a coplanar barrier grid target type.

33. The invention of claim 21 wherein the periodic varying voltage is sinusoidal.

34. The invention of claim 21 wherein the periodic varying voltage is a rectangular wave.

35. The invention of claim 21 wherein the periodic varying voltage is a triangular wave.

36. The invention of claim 21 wherein the periodic varying voltage is a stepped wave.

37. The invention of claim 21 including means for adjusting the shape and amplitude of the waveform to achieve a specific desired transfer function characteristic for the tube.

38. The invention of claim 36 including means for adjusting the amplitude and duration of the steps to achieve a desired transfer function characteristic.

39. The invention of claim 21 including means for precluding the application of the periodic varying voltage signal during the erase mode.

40. The invention of claim 21 including means for precluding the application of the periodic varying voltage signal during the write mode.

41. The invention of claim 21 wherein the tube is a coplanar barrier grid target type.

42. The invention of claim 21 wherein the means for applying the periodic varying voltage is connected between equipment ground and the source of the reading electron beam.

43. The invention of claim 42 wherein the periodic varying voltage is sinusoidal.

44. The invention of claim 42 wherein the periodic varying voltage is a rectangular wave.

45. The invention of claim 42 wherein the periodic varying voltage is a triangular wave.

46. The invention of claim 42 wherein the periodic varying voltage is a stepped wave.

47. The invention of claim 42 including means for adjusting the shape and amplitude of the waveform to achieve a specific desired transfer function characteristic for the tube.

48. The invention of claim 46 including means for adjusting the amplitude and duration of the steps to achieve a desired transfer function characteristic.

49. The invention of claim 42 including means for precluding the application of the periodic varying voltage signal during the erase mode.

50. The invention of claim 42 including means for precluding the application of the periodic varying voltage signal during the write mode.

51. The invention of claim 42 wherein the tube is a coplanar barrier grid target type.

52. The invention of claim 42 including means for adjusting the amplitude of the periodic varying voltage.

53. The invention of claim 21 wherein the means for applying the varying voltage is connected between equipment ground and the charge storage member.

54. The invention of claim 53 wherein the periodic varying voltage is sinusoidal.

55. The invention of claim 53 wherein the periodic varying voltage is a rectangular wave.

56. The invention of claim 53 wherein the periodic varying voltage is a triangular wave.

57. The invention of claim 53 wherein the periodic varying voltage is a stepped wave.

58. The invention of claim 53 including means for adjusting the shape and amplitude of the waveform to achieve a specific desired transfer function characteristic for the tube.

59. The invention of claim 57 including means for adjusting the amplitude and duration of the steps to achieve a desired transfer function characteristic.

60. The invention of claim 53 including means for precluding the application of the periodic varying voltage signal during the erase mode.

61. The invention of claim 53 including means for precluding the application of the periodic varying voltage signal during the write mode.

62. The invention of claim 53 wherein the tube is a coplanar barrier grid target type.

63. The invention of claim 53 including filter means connected between the charge storage member and the output reading means to preclude application of the high frequency signal to the output reading means.

64. The invention of claim 53 including means for adjusting the amplitude of the periodic varying voltage.

* * * * *